US006625731B1

United States Patent
Plourde (10) Patent No.: US 6,625,731 B1
(45) Date of Patent: Sep. 23, 2003

(54) METHOD OF CONFIGURING A MICROCONTROLLER DURING RESET MODE BY GENERATING AUXILIARY OSCILLATOR SIGNAL AS SUPPLY VOLTAGE RAMPS UP TO READ OPTION WORD FROM CENTRAL MEMORY

(75) Inventor: Oliver Plourde, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/489,365

(22) Filed: Jan. 21, 2000

(30) Foreign Application Priority Data

Feb. 19, 1999 (FR) .............................................. 99 02117

(51) Int. Cl.[7] .............................................. G06F 1/24
(52) U.S. Cl. ...................................... 713/100; 713/500
(58) Field of Search ............................. 713/1, 2, 100, 713/500; 710/104

(56) References Cited

U.S. PATENT DOCUMENTS

| 5,193,199 A | * | 3/1993 | Dalrymple et al. ............. 713/1 |
| 5,243,233 A | * | 9/1993 | Cliff ............................ 327/143 |
| 5,504,903 A | * | 4/1996 | Chen et al. ...................... 713/1 |
| 5,544,092 A | | 8/1996 | Gunther et al. ................ 395/800 |
| 5,598,569 A | * | 1/1997 | Catherwood et al. ............ 714/1 |
| 5,694,067 A | * | 12/1997 | Hull et al. ................... 327/143 |
| 5,812,867 A | * | 9/1998 | Basset ........................... 710/104 |
| 5,892,942 A | * | 4/1999 | Ohnishi et al. .................. 713/1 |

FOREIGN PATENT DOCUMENTS

| EP | 536756 A1 | * | 4/1993 | ............. G06F/1/24 |
| EP | 05268017 | | 10/1993 | .......... H03K/5/135 |
| EP | 0606806 | | 7/1994 | ............. G06F/9/44 |
| JP | 05012455 A | * | 1/1993 | ........... G06F/15/78 |

OTHER PUBLICATIONS

Microchip Technology Inc., "dsPCI30F 16–bit MCU Family Reference Manual", Section 7. Oscillator, Aug. 27, 2002.*

* cited by examiner

*Primary Examiner*—Thomas Lee
*Assistant Examiner*—Albert Wang
(74) *Attorney, Agent, or Firm*—Lisa K. Jorgenson; Allen, Dyer, Doppelt, Milbrath & Gilchrist, P.A.

(57) ABSTRACT

A method of configuring a microcontroller in a reset mode is provided, wherein the microcontroller includes a central processing unit, a central memory and a main oscillator. The method includes the steps of activating an auxiliary oscillator of the microcontroller, generating a clock signal with the auxiliary oscillator, and reading an option word from a memory of the microcontroller at the rate of the clock signal. The method further includes the step of loading at least one bit of the option word into a configuration register of at least one internal circuit of the microcontroller, such as an internal peripheral circuit.

22 Claims, 2 Drawing Sheets

FIG_1

FIG_3

METHOD OF CONFIGURING A MICROCONTROLLER DURING RESET MODE BY GENERATING AUXILIARY OSCILLATOR SIGNAL AS SUPPLY VOLTAGE RAMPS UP TO READ OPTION WORD FROM CENTRAL MEMORY

FIELD OF THE INVENTION

The present invention relates to a method of configuring a microcontroller in a reset mode.

BACKGROUND OF THE INVENTION

Figure 1:
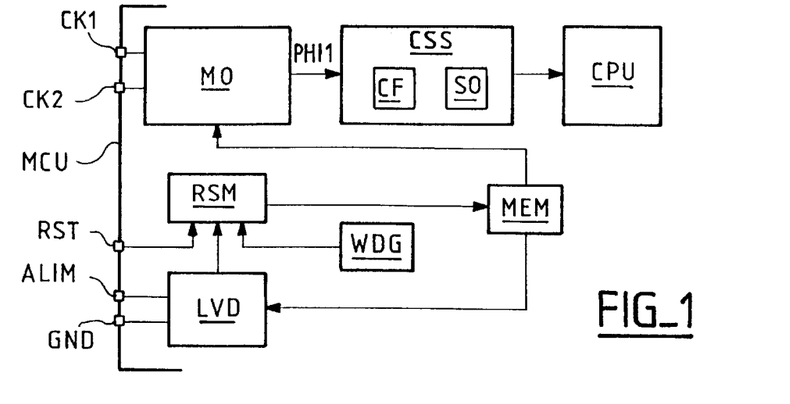
FIG. 1 is a simplified diagram of a microcontroller according to the prior art.

FIG. 1 shows a simplified diagram of a microcontroller MCU. The microcontroller, in particular, includes a central processing unit (CPU) or core which constitutes the heart of the microcontroller, and a memory MEM, such as a ROM, EPROM, EEPROM or Flash-EPROM for storing a program known as the user program. This program is loaded by the user prior to installing the microcontroller in an application.

The microcontroller MCU also includes a circuit MO serving as a main oscillator. The main oscillator MO generates a clock signal PHI1, whose frequency is on the order of about 10 MHZ, which is used to activate the microcontroller's internal circuits. In particular, the CPU is activated when in the execution mode. The nominal frequency $f_{CPU}$ of this clock signal PHI1 is 8 MHZ, for example. The oscillator circuit MO can be configured by selecting a specific oscillator source for the main oscillator chosen among an external resonator (quartz) having a set frequency, an external RC circuit, an internal RC circuit, or even an external oscillator. The source of the oscillator circuit is connected to two input pins CK1 and CK2 of the microcontroller.

A clock filtering circuit CSS with a clock filter and a back-up oscillator SO is also included in the microcontroller MCU. The purpose of such a circuit is, first, to suppress pulses on the signal PHI1 occurring at a frequency exceeding a first predetermined threshold. Second, to additionally supply the CPU with a low frequency signal delivered by the back-up oscillator when the clock signal PHI1 is absent or its frequency is below a second threshold lower than the first threshold. In other words, the CSS circuit serves to continuously supply the CPU in the execution mode with a clock signal whose frequency $f_{CPU}$ remains within a predetermined range between the above-mentioned second and first thresholds.

The microcontroller MCU further includes a watchdog circuit WDG, and a low voltage detector LVD circuit for detecting an excessively low power supply voltage. The low voltage detector LVD receives a power supply voltage and ground through respective input terminals ALIM and GND of the microcontroller.

A reset sequence manager circuit RSM manages the microcontroller's reset sequences. The reset sequences are initiated by reset signals which the RSM circuit receives from the WDG circuit, the LVD circuit, or external the microcontroller through an input terminal RST. One or more analog-to-digital or digital-to-analog converters (not shown) interface with the microcontroller's analog inputs and outputs (also not shown).

The microcontroller generally contains other internal peripheral circuits. The term internal peripheral circuit is understood to mean a circuit internal to the microcontroller other than the CPU and the central memory MEM. These two internal circuits form the fundamental core vital to the operation of any microcontroller.

A reset sequence causes the microcontroller to pass from a start operating mode to a run mode. Between these two modes, i.e., during the reset sequence, the microcontroller is said to be in the reset mode. The run mode is the normal operating mode executing the program loaded into the microcontroller's memory by the user, known as the user program.

The start operating mode depends on the manner in which the reset mode is initiated. When the reset sequence is initiated by powering up the microcontroller (power-on reset), the start mode is a power off mode. In the power off mode, all the microcontroller's internal circuits, except for the reset manager RSM dedicated to managing the reset sequence, are disabled and non-operational. The microcontroller passes over to the run mode only when the level of a power source voltage supplied at the ALIM terminal has exceeded a predetermined threshold, known as the reset threshold. This thereby avoids the problems that could result from the microcontroller operating at too low a supply voltage. Problems include corruption or loss of data, improper sequencing of instructions due to a defective clock signal, etc.

Another manner in which the reset mode is initiated is by an external reset signal, a reset signal from the watchdog circuit WDG, or a reset signal from the low voltage detector circuit LVD. The start operating mode is the run mode.

It has been necessary to provide the user with the option to configure some of the microcontroller's internal circuits to adapt them to application requirements. This ability to configure must not be confused with the loading of the user program into the microcontroller's memory. The user is thus able to activate or deactivate some of the microcontroller's functions or to customize them. This is thus a physical configuration in contrast to the software approach involved in loading the user program. Moreover, in contrast with loading of the user program, this configuration is renewed at each reset.

For example, it may be desirable to allow the user to activate or de-activate the low voltage detector LVD circuit, and/or to select a reset threshold level below which it generates a reset signal. Likewise, it may be desirable to activate or deactivate the watchdog circuit WDG.

The above is sometimes accomplished by the step of reading an option word stored in the microcontroller's memory. This step is performed in the run mode. The values of the bits contained in this read out option word serve to set dedicated registers of the microcontroller. The option word can be read statically, i.e., continuously by specific means of the microcontroller, or read dynamically, e.g., by means of a specific instruction which the user must insert in the user program.

However, this method cannot be implemented before the microcontroller is in the run mode. All the microcontroller's internal circuits are inhibited during the reset sequence, apart from the reset sequence manager RSM. This implies, in particular, that the configuration is not possible for the microcontroller circuits that come into play during the reset sequence itself, including the low voltage detector circuit LVD and the main oscillator MO.

It may be desirable to allow the user to configure such internal circuits of the microcontroller before entry into the run mode, and, hence, before starting execution of the user program. For instance, it may be desirable to allow the user to choose the reset threshold level of the low voltage detector circuit LVD. The user may prefer to choose this value specific to the user's application. The higher the reset threshold, the more the operation of the microcontroller is secure. A high reset threshold guarantees that the microcontroller can only be in the run mode when the supply voltage is more than sufficient to ensure correct operation of its internal circuits. On the other hand, the higher the reset threshold, the longer the microcontroller is liable to remain in the unpowered state. Similarly, the user may wish to configure the main oscillator MO so that it operates with one oscillator source or another.

SUMMARY OF THE INVENTION

An object of the present invention is to allow the readout of at least one option word in the microcontroller when in the reset mode. This option word allows the configuration of one or more of the microcontroller's internal circuits.

This object is achieved, in accordance with the present invention, by a method of configuring a microcontroller in a reset mode. The microcontroller comprises a central processing unit, a central memory and a main oscillator which are deactivated. The method comprises the steps of:

a) activating an auxiliary oscillator of the microcontroller;

b) generating a clock signal with the auxiliary oscillator;

c) reading an option word from a memory of the microcontroller at the rate of the clock signal; and d) loading at least one bit of the option word into a configuration register of at least one internal circuit of the microcontroller, notably an internal peripheral circuit.

Accordingly, the option word is read out at the rate of a clock signal generated by an auxiliary oscillator dedicated to that task in the reset mode. The microcontroller's main oscillator is activated only later, possibly after itself having been configured.

By virtue of the method according to the present invention, the microcontroller is configured only by means internal to the microcontroller. No external circuit or component needs to be provided for that purpose in the application. These advantages, as well as other characteristics and advantages shall become more apparent upon reading the description that follows.

BRIEF DESCRIPTION OF THE DRAWINGS

The detailed description is purely given as an illustration and is to be read with reference to the appended drawings, in which:

FIGS. 4a to 4m, which are to be read in reference to FIG. 3, are timing diagrams of signals generated upon resetting the microcontroller.

DETAILED DESCRIPTION OF THE PREFERRED EMBODIMENTS

Figure 2:
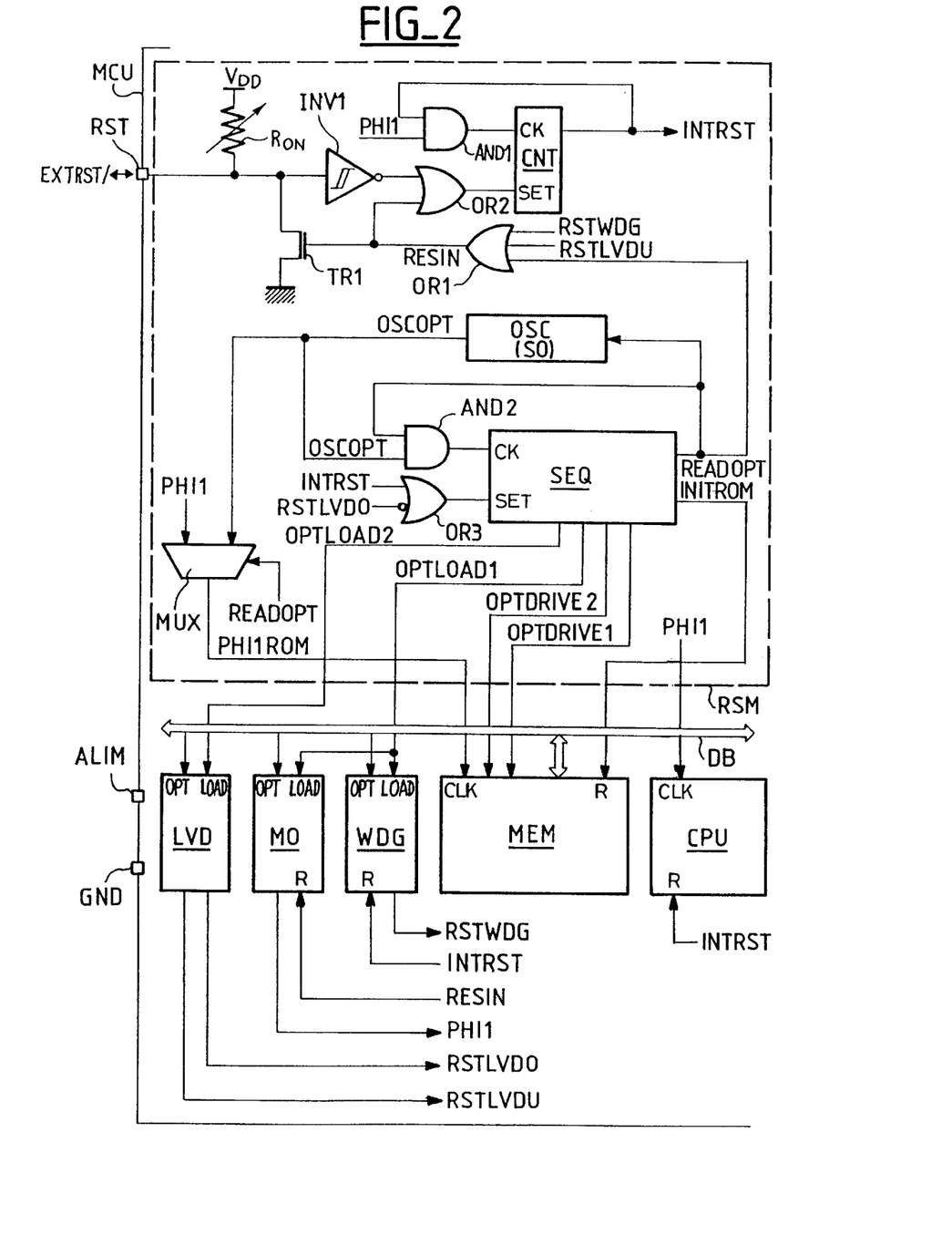
FIG. 2 is a diagram of the internal circuits of a microcontroller allowing implementation of the method according to the present invention.

FIG. 2 shows the internal circuits of the microcontroller which allow the invention to be implemented. In this figure, the same elements as in FIG. 1 are given the same references. The RSM circuit, already described with regard to FIG. 1, comprises a sequencer SEQ provided with a clock input CK and a start input SET. The sequencer SEQ generates READOPT, INITROM, OPTDRIVE1, OPTDRIVE2, OPTLOAD1 and OPTLOAD2 signals whose sequencing shall be described below.

The READOPT signal is sent to a first input of a three-input OR-gate OR1. This gate also receives RSTWDG and RSTLVDU signals on its second and third inputs. These signals are respectively the reset signal delivered by the watchdog circuit WDG, and the reset signal delivered by the low voltage detector circuit LVD. The output of gate OR1 delivers a signal RESIN. The RESIN signal is sent to an activation input R of the main oscillator MO to maintain that internal peripheral circuits are deactivated while the RESIN signal is at logic 1.

The RESIN signal is additionally sent both to a first input of a two-input OR-gate OR2 and the gate of an NMOS transistor TR1. The drain of transistor TR1 is connected to the RST access terminal of the package of the microcontroller MCU. This terminal is an input/output terminal, i.e., it receives or delivers a signal EXTRST/. A resistor $R_{ON}$ is connected between a terminal receiving the voltage $V_{DD}$ and the RST terminal. This resistor can be formed by the channel resistance of a PMOS transistor. The purpose of this resistor is to prevent terminal RST from floating. It thus serves as a pull-up resistor. The RST terminal is also connected to the second input of gate OR2 via an inverter INV1 (Schmitt trigger).

The output of gate OR2 is connected to the start input SET of a counter CNT which is a 16-bit type counter. In other words, the counter can count up to 4096. A clock input CK of that counter is connected to the output of a two-input AND-gate AND1. The first input of gate AND1 is connected to the count output of counter CNT, and the second input receives the clock signal PHI1 delivered by the microcontroller's main oscillator MO. The count output of counter CNT delivers a signal INTRST.

The operation of counter CNT is as follows:

when the start input SET passes from a logic 0 to 1 (i.e., on a rising edge of the signal delivered by gate OR2), the INTRST signal passes to a logic 1 and the value of the counter is reset to zero;

the value of the counter is incremented by one unit at each pulse of the clock signal PHI1 via gate AND1 which acts as a switch controlled by signal PHI1 (due to the fact that INTRST is at a logic 1); and after 4096 cycles of the clock signal PHI1, the INTRST signal returns to a logic 0, where upon gate AND1 acts as an open switch irrespective of the value of the clock signal PHI1. As will have been understood, gate AND1 allows the counter CNT to be deactivated until the next rising edge on the counter's start input SET.

The INTRST signal is sent to an activating input R of circuit WDG and also to an activating input R of the central processing unit CPU. As shall be explained further, the INTRST signal has the effect of maintaining these circuits deactivated, i.e., disabled, in the reset mode.

The READOPT signal delivered by the output of the sequencer SEQ is also sent to an activating input of an auxiliary oscillator OSC of the microcontroller. In a preferred embodiment, this auxiliary oscillator is the back-up oscillator SO of the clock filtering circuit CSS (see FIG. 1) not shown in FIG. 2. In this way, the same oscillator SO fulfills the function of the back-up oscillator in the run mode and the function of the auxiliary oscillator according to the invention in the reset mode.

The auxiliary oscillator OSC generates a clock signal OSCOPT which is sent to a first input of a two-input AND-gate AND2. The frequency of this clock signal OSCOPT is denoted $f_{OSCOPT}$. This clock signal is a low frequency signal, i.e., the frequency $f_{OSCOPT}$ is on the order of a few tens or hundreds of kHz. In one example, this frequency is equal to 225 kHz. The second input of gate AND2 receives the READOPT signal delivered by the output of the sequencer SEQ. The start input SET of the sequencer SEQ is connected to the output of a two-input OR gate OR3. The first input of gate OR3, which is not an inverting input, receives the INTRST signal delivered by the output of the above-mentioned counter CNT. The second input of gate OR3, which is an inverting input, receives a signal RSTLVDO delivered by the detector circuit LVD.

As regards to the generation of the READOPT signal, the operation of sequencer SEQ is as follows:

when the start input SET passes from a logic 0 to 1 (i.e., on a rising edge of the signal delivered by the output of gate OR3), the READOPT signal passes to a logic 1 and the value of the counter is reset to zero. The READOPT signal activates the auxiliary oscillator OSC which then delivers the clock signal OSCOPT;

the value of a counter belonging to the sequencer SEQ (which can count up to 6) is incremented by one unit at each pulse of the clock signal OSCOPT through gate AND2. The latter behaves as a switch controlled by the clock signal OSCOPT (due to the fact that READOPT is at a logic 1);

after 6 cycles of clock signal OSCOPT, the READOPT signal returns to a logic 0, whereby gate AND2 behaves as an open switch irrespective of the value of the clock signal OSCOPT. As will have been understood, gate AND2 allows deactivation of the counter of the sequencer SEQ until the next rising edge at the start input SET. Gate AND2 can be dispensed with when the auxiliary oscillator OSC is deactivated by the transition to a logic 0 of the READOPT signal, i.e., by the falling edge of signal READOPT.

As regards to the generation of the other signals, the operation of the sequencer shall be explained further. Note, nevertheless, that the OPTDRIVE1 and OPTDRIVE2 signals are sent to control inputs of the central memory MEM. The OPTLOAD1 signal is sent to a load input LOAD of both the watchdog circuit WDG and the main oscillator MO. The OPTLOAD2 signal is sent to a load input LOAD of the detector circuit LVD. The INITROM signal is sent to an activation input R of the central memory MEM.

The microcontroller's data bus DB connects the central memory MEM and the central processing unit CPU. The internal peripheral circuits, such as the watchdog circuit WDG, the low voltage detector circuit LVD and the main oscillator MO are also connected to the data bus DB. This allows them to load through an input OPT one or more bits present on the data bus DB when the respective signals OPTLOAD1 or OPTLOAD2 pass to a logic 1, i.e., on a rising edge of these signals. The one or more bits are loaded in one or more configuration registers for these circuits. The operation includes modifying the state of these registers, which is the heart of the configuration of these internal circuits of the microcontroller.

The clock signal OSCOPT is also sent to a first input of a two-input multiplexer MUX. The second input of the multiplexer MUX receives the clock signal PHI1. The READOPT signal is also sent to the control input of multiplexer MUX. Accordingly, the latter delivers at its output a clock signal PHI1ROM which is the signal PHI1 when the READOPT signal is at a logic 0, and which is the OSCOPT signal when the READOPT signal is at a logic 1. The clock signal PHI1ROM is sent to a clock input CLK of microcontroller's central memory MEM. A clock input CLK of the central processing unit CPU receives the clock signal PHI1 delivered by the main oscillator MO.

The steps of the process according to the invention shall now be described with reference to FIG. 3 and the timing diagrams of FIGS. 4a to 4m. These figures relate to a first case in which a reset is initiated upon power on of the microcontroller. The cases for a reset initiated by one of the three signals mentioned earlier in the description shall then be briefly described to the extent that they differ from the first case.

Figure 3:
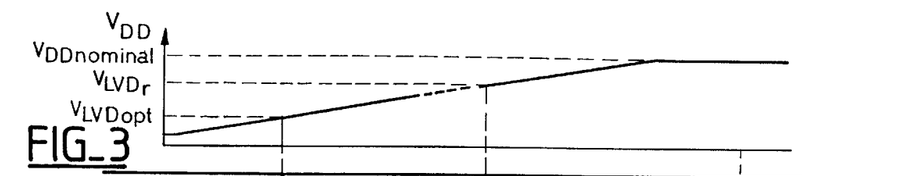
FIG. 3 is a curve of the supply voltage as a function of time during a power on reset according to the present invention.

FIG. 3 shows the curve of supply voltage $V_{DD}$ as a function of time upon power on of the microcontroller. This voltage is applied between the ALIM and GND terminals of the microcontroller MCU. It takes a certain amount of time to pass from a zero value to its nominal value $V_{DDdnominal}$, which is equal to 5 volts in this example. The RSTLVDO and RSTLVDU signals are initially at a logic 1 (FIGS. 4d and 4e) due to the fact that the level of the voltage $V_{DD}$ is lower than a first threshold $V_{LVDopt}$ and a second threshold $V_{LVDr}$ respectively.

When the level $V_{DD}$ is lower than the threshold $V_{LVDopt}$, i.e., while the signal RSTLVDO is at 1, the microcontroller is kept in the power off mode. All the microcontroller's internal circuits are then deactivated, i.e., all the logic circuits are inhibited. In particular, the central memory MEM is deactivated since the INITROM signal (FIG. 4a) is at a logic 1. The main oscillator MO is deactivated since the RESIN signal (FIG. 4c) is at a logic 1, and the central processing unit CPU and the WDG circuit are deactivated since the INTRST signal is at a logic 1. Only the low voltage detector LVD circuit is operative because it is analog in nature. As soon as the level of the voltage $V_{DD}$ exceeds the threshold $V_{LVDopt}$, the RSTLVDO signal passes to a logic 0. The microcontroller MCU is no longer in the power off mode but in the reset mode. The RSM circuit executes a reset sequence.

This sequence comprises four distinct phases. A first phase I1 (FIG. 3), termed configuration phase, is a phase in which the steps of the process according to the invention are executed. Phase I1 comprises a step of activating the auxiliary oscillator OSC. The transition to zero of the RSTLVDO signal generates a rising edge at the start input SET of the sequencer SEQ of the RSM circuit. Thereafter, the READOPT signal passes to a logic 1, which activates the auxiliary oscillator OSC. The latter delivers the clock signal OSCOPT.

In other words, the first step of the process according to the invention includes activating the auxiliary oscillator OSC. The OSCOPT signal is a low frequency signal, i.e., on the order of a few tens or hundreds of kHz. Accordingly, the sequencing for the readout of the option word does not suffer from the fact that the supply voltage $V_{DD}$ can be low, i.e., lower than 3 volts during the reset.

Instead of activating an auxiliary oscillator, such as auxiliary oscillator OSC shown in FIG. 2, it is possible to activate the microcontroller's back-up oscillator SO (see FIG. 1) when the microcontroller is equipped with such an oscillator. Indeed, a back-up oscillator is configured to deliver a low frequency signal. In other words, the oscillator activated at the first step of phase I1 can be the back-up oscillator SO of the microcontroller shown in FIG. 1. This thereby does away with the need for a specific oscillator dedicated to the configuration phase I1.

Figures 4A, 4M:
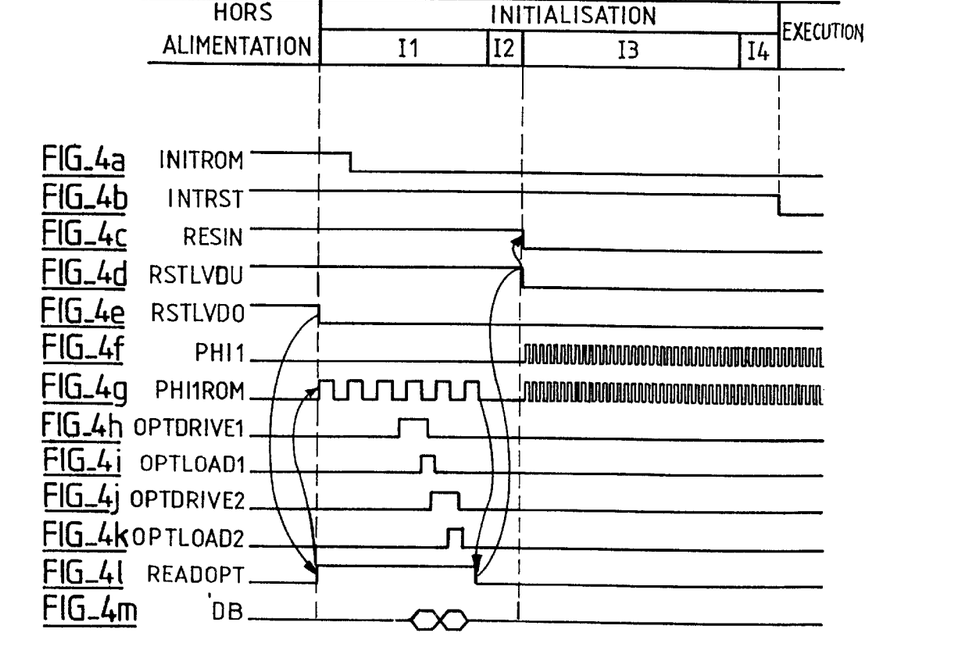
Figures 4A, 4B:
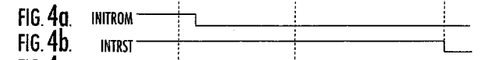
Figures 4C, 4D:
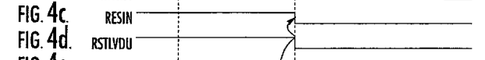
Figures 4E, 4F, 4G, 4H, 4I:
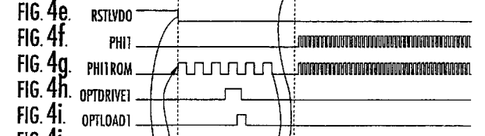

Phase I1 then comprises a step of generating the PHI1ROM clock signal using the auxiliary oscillator OSC that delivers the OSCOPT signal. Indeed, since the READOPT signal is at a logic 1, the PHI1ROM signal at the output of multiplexer MUX is the OSCOPT signal (FIG. 4g). It is recalled that the OSCOPT signal, and hence the PHI1ROM signal during phase I1, is a low frequency signal. Note that, in one example, phase I1 lasts for 6 cycles, i.e., 6 periods, of the PHI1ROM clock signal, as indicated in FIG. 4g.

Phase I1 then comprises a step of reading out at least one option word from the microcontroller's memory (e.g., the central memory MEM of the microcontroller MCU), at the rate of the PHI1ROM clock signal. To this end, the INITROM signal generated by the sequencer SEQ, which was initially at a logic 1, passes to a logic 0 after the first cycle of the PHI1ROM clock signal of phase I1 (FIG. 4a). This signal allows the activation of memory MEM even though the microcontroller is still in the reset mode. After a wait period of two PHI1ROM clock signal cycles to allow the memory readout circuits to set, the sequencer SEQ delivers a pulse at a logic 1 of the OPTDRIVE1 signal (FIG. 4h). This pulse lasts for only one cycle of the PHI1ROM clock signal. It is interpreted as a command to read out an option word at a first particular address of the memory. Subsequently, the corresponding option word is inserted into the data bus DB (FIG. 4m).

In a preferred embodiment (only shown in FIG. 2), the memory in which the option word(s) is/are stored is the microcontroller's central memory, i.e., the one that also stores the user program. With an 8 kb memory organized in 8-bit words, an option word is preferably an 8-bit word. It is simply required to store option words in a memory zone different from the zone reserved for storing the user program.

However, the memory can be a dedicated memory, such as a small ROM, EPROM, EEPROM or Flash-EPROM memory area provided for that purpose. In this case, the INITROM signal is not essential since the dedicated memory need not be deactivated in the reset mode.

Phase I1 finally comprises a step of loading at least one bit of the option word into a configuration register of one or more of the microcontroller's internal peripheral circuits such as the watchdog circuit WDG and/or the main oscillator MO. The sequencer SEQ generates a pulse at a logic 1 of the OPTLOAD1 signal (FIG. 4i). This pulse lasts for only one half period of the PHI1ROM clock signal. The OPTLOAD1 signal causes the loading of one or more bits of the option word contained in the data bus DB into one or more configuration registers for the watchdog circuit WDG and/or the main oscillator MO.

Figures 4J, 4K, 4L, 4M:
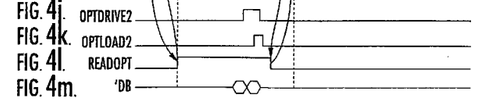

The above-described readout and loading steps can be repeated to read a plurality of option words in succession, and load one or a plurality of other configuration registers of the same internal peripheral circuit(s). This would be the case if eight bits were not sufficient to configure all the microcontroller's internal circuits desired to be configured. Moreover, these steps can be repeated to configure another internal circuit of the microcontroller or several such circuits. This simply requires the provision of specific signals generated by the sequencer SEQ. For instance, FIGS. 4j and 4k show the OPTDRIVE2 and OPTLOAD2 signals generated by the sequencer SEQ for the configuration of the low voltage detector circuit LVD. A pulse at a logic 1 of the OPTDRIVE2 signal is interpreted as a command to read out a second option word at a second specific address of the memory. The OPTLOAD2 signal causes one or more bits of this option word to be loaded into the configuration registers of the low voltage detector circuit LVD.

Naturally, the above-described steps for the WDG, MO and LVD internal peripheral circuits are executed in the same manner for loading configuration registers of any other internal circuit of the microcontroller MCU, notably the filtering circuit CSS of FIG. 1. There again, it is required to provide specific signals generated by the sequencer SEQ. In fact, the above-described process allows configuration of all the internal peripheral circuits of the microcontroller in the reset mode.

According to an advantageous aspect of the invention, the method in particular makes it possible to configure internal circuits of the microcontroller that come into play following the reset sequence, i.e., after phase I1. This is the case, for instance, with the main oscillator MO. This could also be the case with the low voltage detector circuit LVD, whose second threshold $V_{LVDr}$ can thereby be configured so that it can be taken into account or not, and/or be given a predetermined value.

In the case where the option words are stored in the microcontroller's central memory, an option word is accessible for writing only when the microcontroller is in a specific mode, known as the programming mode. This is also the mode which allows the user program to be loaded into the microcontroller's central memory. Normally, an option word is programmed only once by the user, as with the user program. However, if the memory is reprogrammable, there is nothing to prevent this option word from being subsequently modified.

As will have been understood, the duration of the configuration phase I1 depends on the number of option words to be loaded and the number of internal peripheral circuits to be configured. The above example of phase I1 lasting for 6 cycles of the ESCOPT clock signal is, therefore, not limiting. The RSM circuit shall be adapted by choosing a sequencer SEQ with an appropriate counter, i.e., capable of counting up to n, where n is a whole number defining the duration of the configuration phase in terms of the number of cycles of the OSCOPT clock signal.

A phase I3 of the reset sequence (FIG. 3) starts when the level of the power source voltage $V_{DD}$ exceeds the second threshold $V_{LVDr}$ mentioned above. It comprises a time delay step during which the microcontroller's main oscillator MO is activated such that it begins to oscillate. This activation of the main oscillator MO is obtained by the transition to a logic 0 of the RESIN signal which is sent for that purpose to the activation input R of the main oscillator MO. The latter then generates the clock signal PHI1 (FIG. 4f). Note that the WDG circuit, and any other internal peripheral circuit, such as a clock filtering circuit, such as circuit CSS in FIG. 1, as well as the central processing unit CPU, remain deactivated because the INTRST signal is still at a logic 1.

Phase I3 serves to allow the activation and stabilization of signal PHI1 at its nominal oscillation frequency, which is a high frequency. For this reason, phase I3 is referred to as the PHI1 clock signal stabilization phase or main oscillator MO activation and stabilization phase. The duration of this phase is fixed and corresponds to the time judged necessary for this stabilization. This duration corresponds to 4096 cycles of the PHI1 clock signal, which are counted by counter CNT of FIG. 2, as explained above. The main oscillator MO is no longer disabled during this phase. However, the other internal peripheral circuits remain disabled.

In fact, a wait phase I2 can separate the configuration phase I1 and the activation and stabilization phase I3. In FIG. 2, this phase is comprised between the moment when the READOPT signal passes to a logic 0 (which marks the end of the configuration phase I1), and the moment when the RSTLVDU signal passes to a logic 0 (which marks the fact that the level of voltage $V_{DD}$ has exceeded the threshold $V_{LVDr}$). The wait period is not systematically employed and is found especially in the case of a reset initiated upon power on of the microcontroller. As a general rule, it does not occur in other cases. Indeed, it is a phase during which the configuration phase is completed and there is a wait for the start of the stabilization condition to occur, i.e., for the supply voltage $V_{DD}$ to come to exceed the threshold $V_{LVDr}$.

According to a characteristic of the invention, the activation and stabilization phase I3 can start before the end of the configuration phase I1. This results from the fact that the READOPT signal is brought to the input of gate OR1 to maintain the RESIN signal at a logic 1. Accordingly, the main oscillator MO is not activated before the end of phase I1 even if the condition for starting phase I3 is previously met, i.e., even if the RSTLVDU signal passes to a logic 0 during phase I1. Note that in this last case, where there is no wait state I2, the activation and stabilization phase I3 starts immediately after the end of the configuration phase I1. Note also that the READOPT signal having returned to a logic 0 at the end of phase I1 (FIG. 4*l*), the PHI1ROM signal delivered at the output of multiplexer MUX from phase I3 is the PHI1 signal (FIG. 4*g*).

The reset sequence finally comprises a step I4 of loading the address bus with the fetch vector at which is located the start of the user program. This phase comes into play at the end of the main oscillator's activation and stabilization phase I3. It concludes the reset sequence and the microcontroller passes into the execution mode for executing the user program.

The function of transistor TR1 and resistor $R_{ON}$ is to cause the EXTRST/ signal to pass to a logic 0 at the start of reset sequence, i.e., at the start of the configuration phase. This signal, which acts like an output signal, can thus be used by the application as a reset signal for other circuits external to the microcontroller. For that purpose, these circuits must be connected to the RST terminal. Note that the RESIN signal has the effect of maintaining the EXTRST/ signal at a logic 0 throughout the entire configuration phase and during the wait phase I2 if necessary.

There shall now be discussed the case of a reset initiated by the RSTLVDU signal delivered by the low voltage detector circuit LVD (when the level of the voltage $V_{DD}$ drops below the threshold $V_{LVDr}$), or by the RSTWDG- signal delivered by the watchdog circuit WDG, or again by the EXTRST/ external signal acting as an input signal. These cases distinguish from the case of a reset initiated upon power on in two aspects. First, the initial state of certain signals, in particular, the RSTLVDU and RSTLVDO signals. The latter being in any case always at a logic 0 while the $V_{DD}$ voltage level remains above $V_{LVDO}$. Second, the fact that there is in general no wait phase I2, phase I3 starts immediately after the end of phase I1, except for the general case where a reset is initiated by the RSTLVDU reset signal delivered by the LVD circuit.

Regarding the second aspect, it will be observed that the time taken for the supply voltage $V_{DD}$ to reach its nominal value $V_{DDnominal}$ is naturally very short in the case of a reset by an external reset signal or by the watchdog circuit WDG. It is slightly less short in the case of powering on the microcontroller since the settling of $V_{DD}$ to its nominal value is then delayed by the capacitive load on the ALIM terminal. It can also become non-negligible in the case of a reset by the low voltage detector circuit LVD due to the uncontrolled evolution of the $V_{DD}$ supply voltage level.

It will however be noted that the low voltage detector circuit LVD can be made such that there is no second threshold $V_{LVDr}$. The low voltage detector circuit can be made either by design or due to its configuration in accordance with the present invention. Everything then happens as if the RSTLVDU signal were always at a logic 0. In this case, there is no wait phase I2.

That which is claimed is:

1. A method for configuring a microcontroller in a reset mode, the microcontroller comprising a central processing unit (CPU), a central memory, a main oscillator, and a data bus connected to the CPU, the central memory and the main oscillator, the method comprising the steps of:
   activating an auxiliary oscillator of the microcontroller;
   generating a clock signal with the auxiliary oscillator;
   reading an option word from the central memory of the microcontroller based upon the clock signal; and
   loading at least one bit of the option word into a configuration register of at least one internal circuit of the microcontroller while the CPU is inactive during the reset mode.

2. A method according to claim 1, wherein the steps of reading and loading are repeated to read successively a plurality of option words and to load other configuration registers.

3. A method according to claim 1, wherein a frequency of the clock signal delivered by the auxiliary oscillator is less than a frequency of a signal provided by the main oscillator.

4. A method according to claim 1, wherein the microcontroller further comprises a clock filtering circuit including the auxiliary oscillator operating as a back-up oscillator to the main oscillator.

5. A method according to claim 1, wherein the step of reading further comprises generating an activation signal for the central memory.

6. A method according to claim 1, wherein the step of loading at least one bit of the option word read is loaded into a configuration register of the main oscillator for configuring the latter prior to its activation.

7. A method for configuring a microcontroller in a reset mode, the microcontroller comprising a central processing unit (CPU), a memory, a main oscillator, and a data bus connected to the CPU, the memory and the main oscillator, the method comprising the steps of:
   activating an auxiliary oscillator of the microcontroller;
   generating a clock signal with the auxiliary oscillator;
   reading an option word from the memory of the microcontroller based upon the clock signal;
   loading at least one bit of the option word into a configuration register of at least one internal circuit of the microcontroller; and
   the at least one internal circuit of the microcontroller comprising a main oscillator connected to the data bus, wherein the main oscillator is configured by the at least one bit of the option word prior to its activation and prior to activation of the CPU.

8. A method according to claim 7, wherein the steps of reading and loading are repeated to read successively a plurality of option words and to load other configuration registers.

9. A method according to claim 7, wherein a frequency of the clock signal delivered by the auxiliary oscillator is less than a frequency of a signal provided by the main oscillator.

10. A method according to claim 7, wherein the microcontroller further comprises a clock filtering circuit including the auxiliary oscillator operating as a back-up oscillator to the main oscillator.

11. A method according to claim 7, wherein the memory from which is read the option word is the central memory of the microcontroller; and wherein the step of reading further comprises generating an activation signal for the central memory.

12. A microcontroller comprising:
a data bus;
a central processing unit (CPU) connected to said data bus;
a main oscillator connected to said data bus;
a memory connected to said said data bus;
an auxiliary oscillator connected to said memory;
a reset circuit connected to said memory and to said auxiliary oscillator for reconfiguring the microcontroller when in a reset mode by the steps of:
  activating said auxiliary oscillator,
  generating a clock signal with said auxiliary oscillator,
  reading an option word from said memory based upon the clock signal, and
  loading at least one bit of the option word into a configuration register of said main oscillator while said CPU is inactive.

13. A microcontroller according to claim 12, wherein the steps of reading and loading are repeated to read successively a plurality of option words and to load other configuration registers.

14. A microcontroller according to claim 12, wherein a frequency of the clock signal delivered by said auxiliary oscillator is less than a frequency of a signal provided by said main oscillator.

15. A microcontroller according to claim 12, wherein the microcontroller further comprises a clock filtering circuit including the auxiliary oscillator operating as a back-up oscillator to the main oscillator.

16. A microcontroller according to claim 12, wherein said memory from which is read the option word is a central memory of the microcontroller; and wherein the step of reading further comprises generating an activation signal for said central memory.

17. A microcontroller according to claim 12, wherein the step of loading at least one bit of the option word read is loaded into a configuration register of said main oscillator for configuring the latter prior to its activation.

18. A microcontroller comprising:
a data bus;
a central processing unit (CPU) connected to said data bus;
a main oscillator connected to said data bus;
a clock filtering circuit connected between said CPU and said main oscillator comprising an auxiliary oscillator operating as a back-up oscillator to said main oscillator;
a memory connected to said data bus; and
a reset circuit connected to said memory for reconfiguring the microcontroller when in a reset mode by the steps of:
  activating said auxiliary oscillator,
  generating a clock signal with said auxiliary oscillator,
  reading an option word from said memory based upon the clock signal, and
  loading at least one bit of the option word into a configuration register of said main oscillator while said CPU is inactive.

19. A microcontroller according to claim 18, wherein the steps of reading and loading are repeated to read successively a plurality of option words and to load other configuration registers.

20. A microcontroller according to claim 18, wherein a frequency of the clock signal delivered by said auxiliary oscillator is less than a frequency of a signal provided by said main oscillator.

21. A microcontroller according to claim 18, wherein said memory from which is read the option word is a central memory of the microcontroller; and wherein the step of reading further comprises generating an activation signal for said central memory.

22. A microcontroller according to claim 18, wherein the step of loading at least one bit of the option word read is loaded into a configuration register of said main oscillator for configuring the latter prior to its activation.

* * * * *

UNITED STATES PATENT AND TRADEMARK OFFICE
CERTIFICATE OF CORRECTION

PATENT NO.    : 6,625,731 B1
DATED         : September 23, 2003
INVENTOR(S)   : Olivier Plourde It is certified that error appears in the above-identified patent and that said Letters Patent is hereby corrected as shown below:

The title page should be deleted to appear as per attached title page.

<u>Drawings,</u>
Sheet 1 of 2, delete "FIGS. 3 – 4M"
Insert:

UNITED STATES PATENT AND TRADEMARK OFFICE
CERTIFICATE OF CORRECTION

PATENT NO. : 6,625,731 B1
DATED : September 23, 2003
INVENTOR(S) : Olivier Plourde It is certified that error appears in the above-identified patent and that said Letters Patent is hereby corrected as shown below:

<u>Drawings cont'd,</u>
Sheet 2 of 2, delete "FIG. 2"
Insert:

FIG. 2.

Signed and Sealed this

Seventeenth Day of February, 2004

JON W. DUDAS
*Acting Director of the United States Patent and Trademark Office*

(12) United States Patent
Plourde (10) Patent No.: US 6,625,731 B1
(45) Date of Patent: Sep. 23, 2003

(54) METHOD OF CONFIGURING A MICROCONTROLLER DURING RESET MODE BY GENERATING AUXILIARY OSCILLATOR SIGNAL AS SUPPLY VOLTAGE RAMPS UP TO READ OPTION WORD FROM CENTRAL MEMORY (75) Inventor: Oliver Plourde, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/489,365

(22) Filed: Jan. 21, 2000

(30) Foreign Application Priority Data

Feb. 19, 1999 (FR) .................................. 99 02117

(51) Int. Cl.[7] .............................................. G06F 1/24
(52) U.S. Cl. ................................. 713/100; 713/500
(58) Field of Search ........................... 713/1, 2, 100, 713/500; 710/104

(56) References Cited

U.S. PATENT DOCUMENTS

| 5,193,199 A | * | 3/1993 | Dalrymple et al. | 713/1 |
| 5,243,233 A |   | 9/1993 | Cliff | 327/143 |
| 5,504,903 A | * | 4/1996 | Chen et al. | 713/1 |
| 5,544,092 A |   | 8/1996 | Gunther et al. | 395/800 |
| 5,598,569 A | * | 1/1997 | Catherwood et al. | 714/1 |
| 5,694,067 A | * | 12/1997 | Hull et al. | 327/143 |
| 5,812,867 A | * | 9/1998 | Basset | 710/104 |
| 5,892,942 A | * | 4/1999 | Ohnishi et al. | 713/1 |

FOREIGN PATENT DOCUMENTS

| EP | 536756 A1 | * | 4/1993 | G06F/1/24 |
| EP | 05268017 |  | 10/1993 | H03K/5/135 |
| EP | 0606806 |  | 7/1994 | G06F/9/44 |
| JP | 05012455 A | * | 1/1993 | G06F/15/78 |

OTHER PUBLICATIONS

Microchip Technology Inc., "dsPCI30F 16–bit MCU Family Reference Manual", Section 7. Oscillator, Aug. 27, 2002.*

* cited by examiner

*Primary Examiner*—Thomas Lee
*Assistant Examiner*—Albert Wang
(74) *Attorney, Agent, or Firm*—Lisa K. Jorgenson; Allen, Dyer, Doppelt, Milbrath & Gilchrist, P.A.

(57) ABSTRACT

A method of configuring a microcontroller in a reset mode is provided, wherein the microcontroller includes a central processing unit, a central memory and a main oscillator. The method includes the steps of activating an auxiliary oscillator of the microcontroller, generating a clock signal with the auxiliary oscillator, and reading an option word from a memory of the microcontroller at the rate of the clock signal. The method further includes the step of loading at least one bit of the option word into a configuration register of at least one internal circuit of the microcontroller, such as an internal peripheral circuit.

22 Claims, 2 Drawing Sheets

UNITED STATES PATENT AND TRADEMARK OFFICE
CERTIFICATE OF CORRECTION

PATENT NO.    : 6,625,731 B1                                            Page 1 of 3
DATED         : September 23, 2003
INVENTOR(S)   : Olivier Plourde It is certified that error appears in the above-identified patent and that said Letters Patent is hereby corrected as shown below:

The title page should be deleted to appear as per attached title page.

Title page,
Item [75], Inventors, delete "Oliver" insert -- Olivier --

Drawings,
Sheet 1 of 2, delete "FIG. 1"
Insert:

Sheet 1 of 2, delete "FIGS. 3 – 4M "
Insert:

(12) United States Patent
Plourde (10) Patent No.: US 6,625,731 B1
(45) Date of Patent: Sep. 23, 2003

(54) METHOD OF CONFIGURING A MICROCONTROLLER DURING RESET MODE BY GENERATING AUXILIARY OSCILLATOR SIGNAL AS SUPPLY VOLTAGE RAMPS UP TO READ OPTION WORD FROM CENTRAL MEMORY

(75) Inventor: Oliver Plourde, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/489,365

(22) Filed: Jan. 21, 2000

(30) Foreign Application Priority Data

Feb. 19, 1999 (FR) .............................................. 99 02117

(51) Int. Cl.[7] .............................................. G06F 1/24
(52) U.S. Cl. ................................. 713/100; 713/500
(58) Field of Search .............................. 713/1, 2, 100, 713/500; 710/104

(56) References Cited

U.S. PATENT DOCUMENTS

| | | | |
|---|---|---|---|
| 5,193,199 A | * 3/1993 | Dalrymple et al. | 713/1 |
| 5,243,233 A | * 9/1993 | Cliff | 327/143 |
| 5,504,903 A | * 4/1996 | Chen et al. | 713/1 |
| 5,544,092 A | 8/1996 | Gunther et al. | 395/800 |
| 5,598,569 A | * 1/1997 | Catherwood et al. | 714/1 |
| 5,694,067 A | * 12/1997 | Hull et al. | 327/143 |
| 5,812,867 A | * 9/1998 | Basset | 710/104 |
| 5,892,942 A | * 4/1999 | Ohnishi et al. | 713/1 |

FOREIGN PATENT DOCUMENTS

| | | | |
|---|---|---|---|
| EP | 536756 A1 | * 4/1993 | G06F/1/24 |
| EP | 05268017 | 10/1993 | H03K/5/135 |
| EP | 0606806 | 7/1994 | G06F/9/44 |
| JP | 05012455 A | * 1/1993 | G06F/15/78 |

OTHER PUBLICATIONS

Microchip Technology Inc., "dsPCI30F 16-bit MCU Family Reference Manual", Section 7. Oscillator, Aug. 27, 2002.*

* cited by examiner

Primary Examiner—Thomas Lee
Assistant Examiner—Albert Wang
(74) Attorney, Agent, or Firm—Lisa K. Jorgenson; Allen, Dyer, Doppelt, Milbrath & Gilchrist, P.A.

(57) ABSTRACT

A method of configuring a microcontroller in a reset mode is provided, wherein the microcontroller includes a central processing unit, a central memory and a main oscillator. The method includes the steps of activating an auxiliary oscillator of the microcontroller, generating a clock signal with the auxiliary oscillator, and reading an option word from a memory of the microcontroller at the rate of the clock signal. The method further includes the step of loading at least one bit of the option word into a configuration register of at least one internal circuit of the microcontroller, such as an internal peripheral circuit.

22 Claims, 2 Drawing Sheets

UNITED STATES PATENT AND TRADEMARK OFFICE
CERTIFICATE OF CORRECTION

PATENT NO. : 6,625,731 B1
DATED : September 23, 2003
INVENTOR(S) : Olivier Plourde Page 3 of 3

It is certified that error appears in the above-identified patent and that said Letters Patent is hereby corrected as shown below:

Drawings cont'd,
Sheet 2 of 2, delete "FIG. 2"
Insert:

This certificate supersedes Certificate of Correction issued February 17, 2004.

Signed and Sealed this

Thirteenth Day of July, 2004

JON W. DUDAS
*Acting Director of the United States Patent and Trademark Office*